United States Patent [19]

Hanaoka

[11] 4,340,914
[45] Jul. 20, 1982

[54] THERMOMAGNETIC RECORDING AND REPRODUCING APPARATUS

[75] Inventor: Naohiro Hanaoka, Hachioji, Japan

[73] Assignee: Olympus Optical Co., Ltd., Tokyo, Japan

[21] Appl. No.: 133,145

[22] Filed: Mar. 24, 1980

[30] Foreign Application Priority Data

Mar. 22, 1979 [JP] Japan .................................. 54-33489

[51] Int. Cl.³ .............................................. G11B 5/02
[52] U.S. Cl. ........................................ 360/59; 346/159
[58] Field of Search .................. 360/59, 114, 110, 66; 346/159, 160

[56] References Cited

U.S. PATENT DOCUMENTS

| | | | |
|---|---|---|---|
| 3,230,517 | 1/1966 | Supernowicz | 360/118 |
| 3,453,646 | 7/1969 | Speliotis et al. | 360/59 |
| 3,626,114 | 12/1971 | Lewicki | 360/59 |

*Primary Examiner*—Vincent P. Canney
*Attorney, Agent, or Firm*—Toren, McGeady & Stanger

[57] ABSTRACT

A heat magnetic recording and reproducing apparatus is disclosed. The apparatus comprises a record medium running in a predetermined direction, a means for generating a laser light beam for locally heating the medium, a magnetic field generating device for generating a magnetic field at the heated portion, an information recording means provided in opposition to the magnetic field generating device and having an auxiliary magnetic pole piece for focusing a magnetic flux from the magnetic field generating device into at least the heated portion, a means provided at a front stage of the information recording means to the running of the medium for generating a laser light beam for locally heating the medium, a magnetic field generating device for generating a magnetic field at the heated portion, and an information erasing means having an auxiliary magnetic pole piece for focusing a magnetic flux from the magnetic field generating device into the heated portion.

8 Claims, 6 Drawing Figures

THERMOMAGNETIC RECORDING AND REPRODUCING APPARATUS

BACKGROUND OF THE INVENTION

This invention relates to a thermomagnetic recording and reproducing apparatus, particularly for recording and reproducing data on a magnetic medium such as a tape by heating the medium along a continuous path with a focused laser beam.

Various types of thermomagnetic recording and reproducing devices have been proposed. For example, such a device may use a recording medium composed of a thin film of MnBi and utilize the temperature dependency of the coercive force of such a thin film by focusing a laser light beam along a continuous path of spots and causing magnetization inversion with the heat of the spot. Other proposed devices focus a laser beam on the medium to locally heat the medium so as to decrease its coercive force and magnetize the medium with magnetic fields that vary in accordance with signals to be recorded.

The latter means involve locally heating a medium by the energy of a laser beam so as to decrease the coercive force at a path of spots on the medium and to thermomagnetically write data with a magnetic field that acts on the spots.

Practically, however, if the laser light beam irradiates the medium, temperature distribution of the medium varies from a center 0 of the spot encountered by the laser beam as shown in FIG. 1. This means that the possibility exists of producing magnetization over a comparatively wide range around the center 0 of the spot. As a result, the magnetized region may be quite wide and this wide region may considerably reduce the available recording density.

Consideration has been given to applying an external magnetic field for preventing magnetization inversion caused by irradiation of the medium by a laser light beam, so as to limit the range of magnetization inversion and to prevent extension of the area of magnetization inversion at any one point.

However, as a practical matter, it has been very difficult to control and limit the magnetic field to produce a fine range of magnetization inversion.

SUMMARY OF THE INVENTION

It is an object of the present invention to eliminate the above described disadvantages of the conventional heat magnetic recording and reproducing apparatus. It is another object of the present invention to provide a heat magnetic recording and reproducing apparatus for surprisingly increasing recording density to a recording medium and carrying out recording in such a case with high precision.

According to the present invention a heat magnetic recording and reproducing apparatus comprises a record medium running in a predetermined direction, a means for generating laser light beam for locally heating the medium, a magnetic field generating device for generating a magnetic field at the heated portion, an information recording means provided in opposition to the magnetic field generating device and having an auxiliary magnetic pole piece for focusing a magnetic flux from the magnetic field generating device into at least the heated portion, a means provided at a front stage of the information recording means to the running of the medium for generating laser light beam for locally heating the medium, a magnetic field generating device for generating a magnetic field at the heated portion, and an information erasing means having an auxiliary magnetic pole piece for focusing a magnetic flux from the magnetic field generating device into the heated portion. The information recording means decreases a coercive force of the heated portion of the medium so as to record a predetermined information on the medium by a magnetic field in accordance with to be recorded of the magnetic field generating device. The information recording means generates a biasing magnetic field from the magnetic field generating device and records a predetermined information on the medium by laser light beam modulated by signals to be recorded. The information erasing means makes a spot diameter on the medium by laser light beam larger than the spot diameter on the medium by laser light beam of the information recording means.

DESCRIPTION OF THE PREFERRED EMBODIMENT

Figure 1:
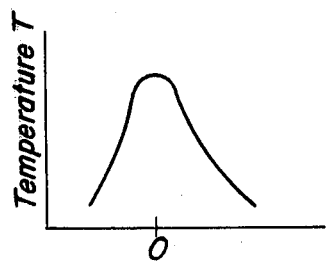
FIG. 1 is a diagram showing the temperature distribution of a laser light beam spot.
Figure 2:
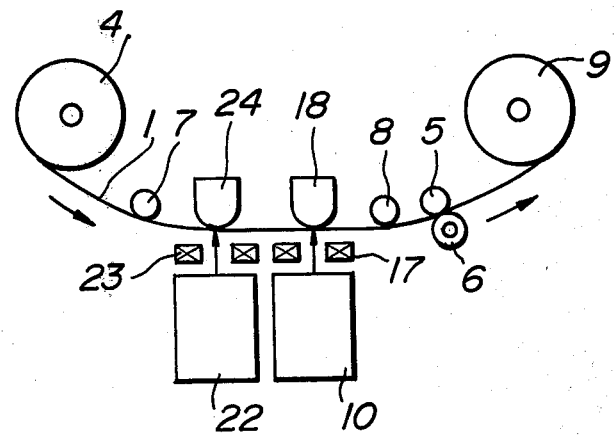
FIG. 2 is a plan view showing a construction of one embodiment of a heat magnetic recording and reproducing apparatus according to the present invention.
Figure 3:
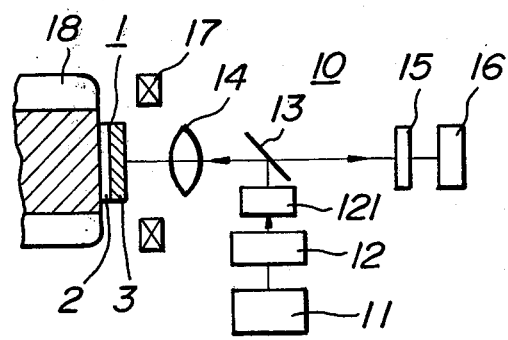
FIG. 3 is a side view showing a construction of a laser light generating means used in the apparatus shown in FIG. 2.

FIG. 2 shows one embodiment of the present invention in a system for making recording by magnetizing a record medium with a magnetic field varied on the basis of signals to be recorded. In FIG. 2, reference numeral 1 indicates a tape-like record medium which, as shown in FIG. 3, is made by causing adherence of a magnetic thin film 3 such as MnBi or the like to a base member 2 by vapor deposition or spattering. The tape-like record medium 1 is wound around a supply reel 4, run by a capstan 5 and a pinch roller 6 at a constant speed and wound to a take-up reel 9 through guides 7, 8.

A laser light generating arrangement 10 generates a laser light beam used for recording and reproducing, and as shown in FIG. 3, directs the laser light beam from a light source or laser 11 to a half-mirror 13 through a light modulator 12 and polarizer 121, reflects the laser light beam at the half-mirror 13 and directs it to the record medium 1 through a lens 14. The laser light beam is focused on the surface of the record medium 1. Moreover, an analyzer 15 and a photoelectric transducer element 16 are arranged on an extension line extending through the half-mirror 13 of an optical axis passing through the lens 14. The analyzer 15 and the photoelectric transducer element 16 detect the laser light beam reflected by the record medium 1 during reproducing with use of a Kerr effect.

At the neighborhood of the laser light beam irradiating portion of the record medium 1 a magnetic field signal generating device, such as a coil 17, generates a magnetic field varied in accordance with signals to be recorded, for example, digital signals. This results in a magnetic flux applied to the record medium 1 while it is heated by the laser light beam of the laser light generating means 10.

Moreover, an auxiliary magnetic pole piece 18 is provided in opposition to the coil 17 by sandwiching the record medium 1. The magnetic pole piece 18 focuses the magnetic flux of the coil 17 and is arranged adjacent to the record medium 1 for making the laser light beam close to the focusing position.

Figure 4:
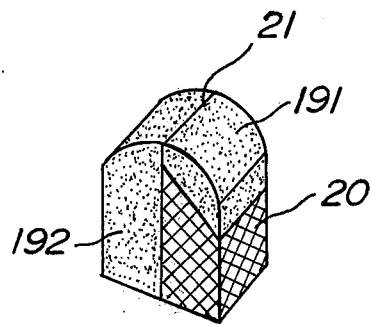
FIG. 4 is a perspective view shoeing an auxiliary magnetic pole piece used in the apparatus shown in FIG. 2.

The auxiliary magnetic pole piece 18, as shown in FIG. 4, is obtained by joining a ferromagnetic body 20 such as ferrite or the like with a non-magnetic body 191 such as ceramics or the like, optically grinding the joined end surface, bonding a ferromagnetic body 21 of a comparatively high saturation magnetic flux density such as Permalloy or Sendust or the like of about $1\mu$ thick to the optically ground end surface by spattering or the like, further abutting it with the other non-magnetic body 191 which joined surface is previously ground, and forming a rounded end surfacer. In order to make the magnetic flux better, the ferromagnetic body 20 extends close to the end surfacer so as to make resistance of a magnetic circuit for the magnetic flux entering from the ferromagnetic body 21 small.

A laser light generating arrangement generates a laser light beam used for erasing. The laser light generating arrangements 22 is the same as the laser light generating arrangement 10 for recording and reproducing as described above, and comprises a light source, a light modulator, a half-mirror and a lens as well as the above, not shown, so as to irradiate the laser light beam on the record medium 1. In this case, the laser light beam focuses on the record medium 1, and the beam spot in this case is larger in diameter than the spot of the laser light beam when recording, so as to produce no remainder from erasing to the movement of the record medium 1.

A coil 23 generates a magnetic field in the neighborhood of the laser light beam irradiating the record medium 1 and produced by the laser light generating arrangement 22. The coil 23 generates the magnetic field in a predetermined direction, and the magnetic flux produced therefrom is applied to the record medium 1 heated by the laser light beam.

An auxiliary magnetic pole piece 24 serves for erasing and is located opposite the coil 23 across the record medium 1. The auxiliary magnetic pole piece 24 has the same construction as the aforementioned auxiliary magnetic pole piece 18 so as to focus the magnetic flux of the coil 23.

Figure 5:
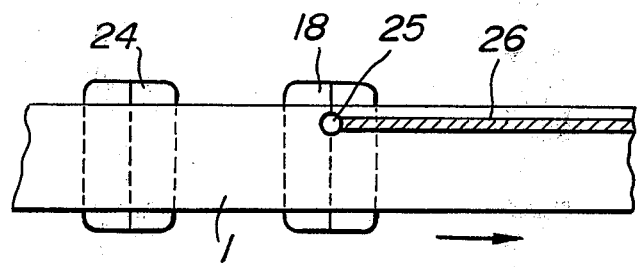
FIG. 5 is a side view showing a magnetized track of a record medium.

In addition, according to such construction, auxiliary magnetic pole piece 18, 24 are placed against the tape-like record medium 1 as shown in FIG. 5. A linear magnetized track 26 is drawn on the record medium 1 by the movement of the record medium 1 in the direction of an arrow as shown against a focus position 25 of the laser light beam of the laser light generating arrangement 10.

The operation of this embodiment will be explained for the condition that the magnetic field is varied by signals to be recorded, a record medium is magnetized by this magnetic field and recorded. Therefore, the light modulator 12 does not perfrom its modulation function herein.

In the first place, in recording data, the tape-like record medium 1 is run at a given speed in the direction of an arrow as illustrated by means of the capstan 5 and the pinch roller 6. In this state, when the laser light beam is generated by the light source or laser 11 of the laser light generating arrangement 10, the laser light beam is applied to the half-mirror 13 through the light modulator 12 (no modulation) and the polarizer 121, reflected therein and applied to the record medium 1 through the lens 14. As a result, the laser light beam is focused on the record medium 1. When the laser light beam is focused, a spot portion is locally heated and its coercive force is decreased. Under this state, if the magnetic field in accordance with signals to be recorded is generated by the coil 17, the magnetic flux magnetizes the record medium 1 heated by the beam spot and a predetermined information is recorded. In this case, the generated magnetic flux of the coil 17 is focused to the very narrow (about $1\mu$) portion of the ferromagnetic body 21 of the auxiliary magnetic pole piece 18 and applied to the heated portion of the record medium 1 from the vertical direction. Accordingly, even if the laser light beam focused on the record medium 1 extends at the heated portion of the beam spot, the magnetization region is limited to the extremely narrow portion of the ferromagnetic body 21 of the auxiliary magnetic pole piece 18, so that recording density can be increased surprisingly.

In the same manner, the information is recorded with high density along the magnetization track 26 as shown in FIG. 5 by running the record medium 1.

Secondly, in order to erase the contents recorded on the record medium 1, the laser light beam is applied from the laser light generating means 22 to the record medium 1 running in the direction of the arrow. Then, the spot portion where the laser light beam is focused on the record medium 1 is heated and the coercive force is decreased. Under this state, if a unidirectional magnetic field is generated from the coil 23, the record medium 1 heated by the beam spot is magnetized in one direction and erased. In this case, the generated magnetic flux of the coil 23 is focused into the auxiliary magnetic pole piece 24 and applied to the heated portion of the record medium 1 from the vertical direction, so that the erasing effect is further increased. Moreover, the beam spot of the laser light beam in this case is larger than the beam spot of the laser light beam when recording in diameter, so that the positive erasing can be carried out without any remainder of erasing.

It is a matter of course that such erasing operation is simultaneously carried out at the preceding stage in case of the above described recording, thereby contributing to the above-described preferable erasing effect and information recording with high precision.

Thirdly, in order to reproduce the contents recorded on the record medium 1, the record medium 1 is run in the arrow's direction as described above, the laser light beam is applied to the record medium 1 from the laser light generating means 10. In this case, the strength of the laser light beam differs from that when recording but does not exceed the extend for causing magnetization inversion of the record medium 1. Moreover, the light reflected from the record medium 1 is received by the analyzer 15 through the lens 14 and the half-mirror 13 and a signal is detected by the magnetic Kerr effect with the use of the photoelectric transducer element 16. As a result, the information is reproduced along the magnetic track by running the record medium 1.

This construction can increase the recording density to the record medium surprisingly, and as a result, a very efficient information can be recorded very efficiently. Also, because the recorderasing for increasing the erasing efficiency is assembled in the preceding stage of the information recording, the information recording with high precision can be carried out. Moreover, these information recording and erasing are efficiently used by focusing the magnetic flux, so that energy for recording and erasing can be minimized.

Figure 6:
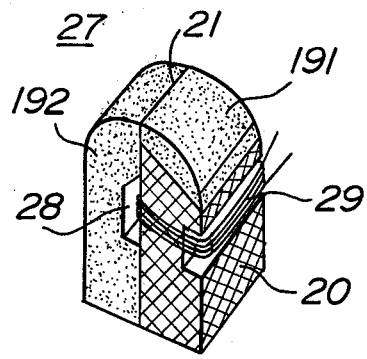
FIG. 6 is a perspective view showing another embodiment of the auxiliary magnetic pole piece for erasing used in the apparatus shown in FIG. 2.

In addition, the present invention is not limited to the above embodiment but can be modified without departing from the scope of the invention. For example, as the erasing auxiliary magnetic pole piece 24, that shown in FIG. 6 can be used. That is, the magnetic pole piece 27 is provided with a window 28 at the non-magnetic body 192 and a coil is wound around the ferromagnetic bodies 20, 21 through the window 28. A direct current flows into the coil 29 and the magnetic flux in the certain direction is generated. In addition, when the magnetic pole piece 27 is substituted for the above-described magnetic pole piece 24, the coil 23 can be omitted.

In such recording the record medium is magnetized by the magnetic field varied in accordance with the signals to be recorded. The system for carrying out the recording and reproducing involves generating a certain magnetic field as a biasing magnetic field from the magnetic field generating device, i.e., the coil 17, and modulating the laser light beam with signals to be recorded by the modulator 12. The magnetic flux of the biasing magnetic field can be focused into an extremely narrow area by the auxiliary magnetic pole piece and the extent of the recording region is limited so as to obtain recording with high density.

As described above, the present invention can provide a thermomagnetic recording and reproducing apparatus which can surprisingly increase the recording density to the record medium and record the information with high precision.

What is claimed is:

1. A thermomagnetic recording and reproducing apparatus comprising a record medium running in a predetermined direction, first light generating means for generating a laser light beam for locally heating the medium, a first magnetic field generating device for generating a magnetic field at the heated portion, information recording means provided in opposition to the magnetic field generating device and having a first auxiliary magnetic pole piece for focusing first magnetic flux from the magnetic field generating device into at least the heated portion, second light generating means adjacent the information recording means upstream of the running of the medium for generating a second laser light beam for locally heating the medium, a second magnetic field generating device for generating a second magnetic field at the heated portion, and information erasing means having a second auxiliary magnetic pole piece for focusing a second magnetic flux from the magnetic field generating device into the heated portion.

2. A thermomagnetic recording and reproducing apparatus as in claim 1, wherein the information recording means decreases the coercive force of the heated portion of the medium so as to record predetermined information on the medium by a magnetic field in accordance with signals to be recorded and generated by the magnetic field generating device.

3. A thermomagnetic recording and reproducing apparatus as in claim 1, wherein the information recording means generates a biasing magnetic field from the magnetic field generating device and records predetermined information on the medium by a laser light beam modulated by signals to be recorded.

4. A thermomagnetic recording and reproducing apparatus as in claim 1, wherein the information erasing means forms a spot diameter on the medium with the laser light beam larger than the spot diameter on the medium with the laser light beam of the information recording means.

5. A thermomagnetic recording and reproducing apparatus as in claim 1, wherein said first and second auxiliary magnetic pole pieces includes a pair of non-magnetic members, a ferromagnetic film sandwiched between said members, and a ferromagnetic body larger than said ferromagnetic film, said auxiliary pole piece being positioned to place said ferromagnetic film transverse to the recording medium and transverse to the direction of the travel of the recording medium.

6. An apparatus as in claim 1, wherein said first and second auxiliary magnetic pole pieces each include a ferromagnetic film, means for mounting said ferromagnetic film transverse to the direction of the medium and transverse to the direction of the movement of the medium, and a ferromagnetic body larger than the ferromagnetic film and positioned to be further away from the medium than said magnetic film.

7. An apparatus as in claim 6, wherein said means for mounting said ferromagnetic film includes a non-magnetic member.

8. An apparatus as in claim 5, 6, or 7, wherein one of said auxiliary pole pieces includes a winding around said ferromagnetic body.

* * * * *